United States Patent Office 2,870,879
Patented Jan. 27, 1959

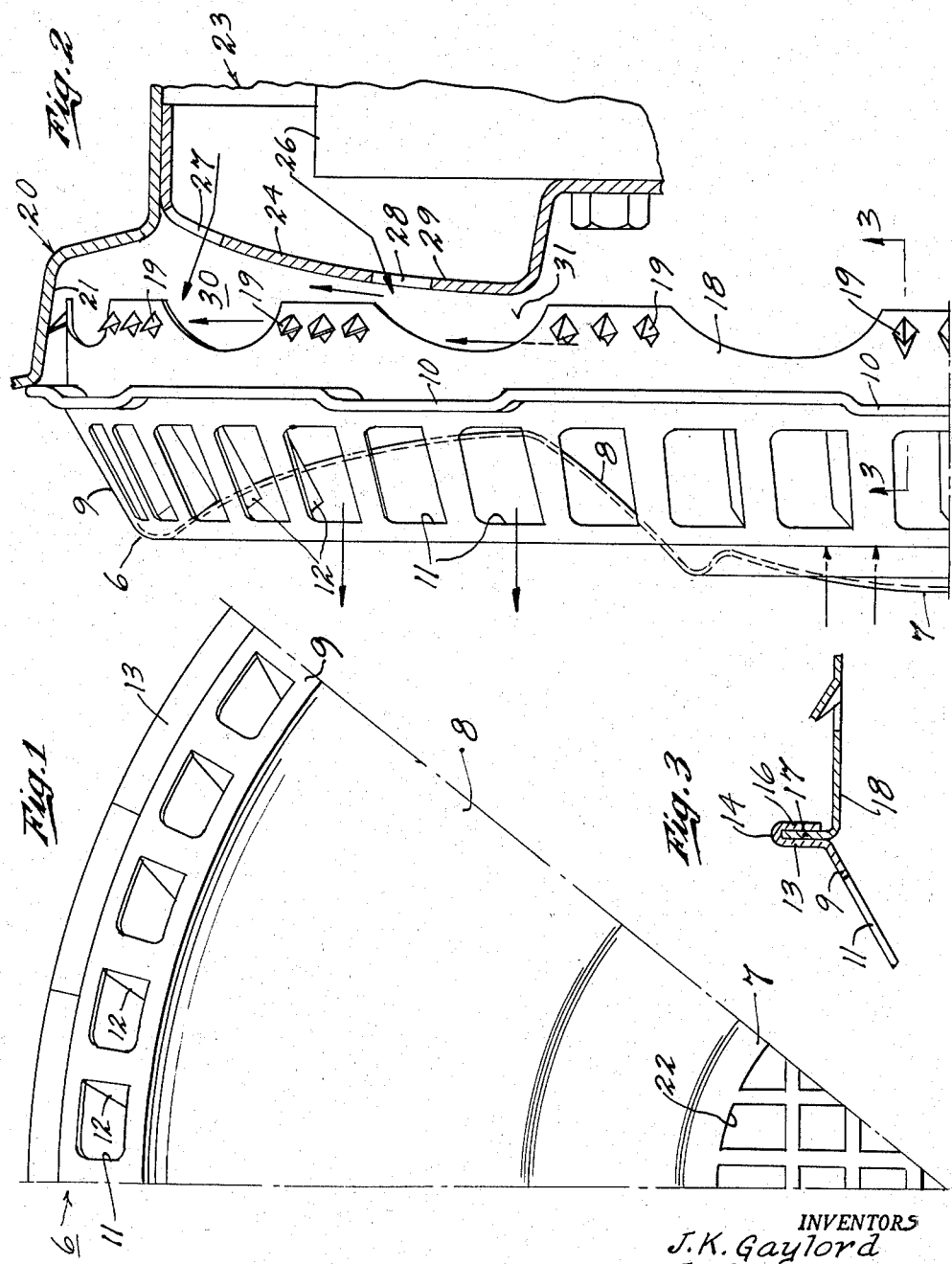

2,870,879

WHEEL STRUCTURES

James K. Gaylord and Lewis E. Thatcher, Chicago, Ill., assignors to Gaylord Products, Incorporated, Chicago, Ill., a corporation of Delaware Application March 22, 1954, Serial No. 417,604

3 Claims. (Cl. 188—264)

This invention relates to wheel structures for vehicles, and more particularly to a wheel structure embodying means for cooling a brake drum associated therewith.

In a conventional wheel structure, the outer periphery of a brake drum is quite close to the tire rim and thereby creates an annular dead air pocket between the brake drum, tire rim and rim supporting plate. During frequent or continuous application of the brake, the brake drum becomes overheated due to lack of circulation of cooling air over the outer surface thereof.

The present invention contemplates the provision of means effective to circulate cooling air over the outer surface of the brake drum and between the drum and the rim supporting plate, said means including a wheel cover of ornamental appearance provided with axial air inlets, marginal air outlets, and vanes or blades to propel streams of air through the outlets.

An object of the present invention resides in the provision of a wheel cover adapted to be detachably mounted upon a conventional automobile wheel and embodying means for circulating cooling air over the outer surface of the brake drum.

Another object of the invention resides in the provision of a wheel cover adapted to be detachably mounted upon the tire rim of an automobile wheel, and formed with an axial air inlet and circumferentially spaced marginal outlets having vanes or blades associated therewith to propel stream of air therethrough.

A further object of the invention is to provide a wheel cover embodying air circulating means effective to induce a flow of cooling air over the outer surface of a brake drum and thence outwardly through apertures provided in the tire rim support plate.

Another object of the invention is to provide a wheel cover which is relatively simple and inexpensive to manufacture, adapted to be readily mounted upon or removed from conventional wheels, and effective to circulate large volumes of cooling air over a brake drum.

The invention embodies other novel features, details of construction and arrangement of parts which are hereinafter set forth in the specification and claims and illustrated in the accompanying drawing, wherein:

Fig. 1 is a front elevational view showing a sector of a wheel cover embodying features of the invention.

Fig. 2 is a fragmentary view, partly in elevation and partly in section, illustrating the manner in which the wheel cover is mounted upon a conventional automobile wheel to effect a circulation of cooling air over the outer surface of the brake drum during movement of the vehicle.

Fig. 3 is a detail sectional view taken along the line 3—3 of Fig. 2.

Referring now to the drawing for a better understanding of the invention, the disk-shape wheel cover 6 is shown as blanked and formed from sheet metal to provide a hub portion 7 merging with an annular trough-shape web 8 which, in turn, merges with an annular frusto-conical outer wall 9. The outer wall 9 is formed with a plurality of air outlet apertures 11 and vanes 12, each vane preferably being pressed inwardly from the wall to form an air outlet aperture.

An annular web 13 projects outwardly from the rearward edge of the outer wall 9 and is joined at 14 to an annular inturned flange 16. An annular flange 17 is provided on the outer end of an annular attachment member 18 for engagement between the web 13 and flange 16. If desired, the web and flanges may be offset at 10 to permit insertion of a tool (not shown) between the cover and tire rim 20 during removal of the cover from a wheel.

The attachment member 18 extends outwardly from the flange 17 and is formed with circumferentially spaced sets of sharply pointed lugs or spurs 19 adapted to bite into the inner annular surface 21 of the tire rim, as illustrated and described with greater particularity in the copending application heretofore mentioned.

The hub portion 7 of the cover is formed with one or more air inlet apertures 22 for the passage of air into the air chamber 30 defined between the cover and the wheel 23. The wheel is of conventional construction embodying a plate 24, welded or otherwise secured to the tire rim 16, and a brake drum 26 bolted to the plate. The plate is provided with the conventional chain slots 27 and is also shown as formed with circumferentially spaced apertures 28 in the annular outwardly bulging portion 29 thereof.

During rotation of a wheel with the cover 6 thereon, the vanes 12 act to propel stream of air outwardly through their related apertures 11 provided in the outer wall 9. Air thus removed from the air chamber 30 is replaced by air drawn into the chamber through the apertures 22, 27 and 28.

It will be noted that the air which passes through the apertures 27 and 28 in the wheel plate 24 is first drawn across the outer surface of the brake drum 26 to convey heat therefrom during engagement of the brakes to decelerate the vehicle. It will also be noted that streams of air from the air inlet apertures 22 discharging through apertures 11 induce cooling air through apertures 27 and 28 which serves to cool the outer wall of the brake drum.

To induce and increase the flow of air through the apertures 28, the web 8 is flared inwardly toward the annular bulging portion 29 of the wheel plate 24 to define therewith a venturi passage 31 within the chamber 30 between the axial air inlet apertures 22 and the peripheral air outlet apertures 11. The combined area of the outlet apertures 11 is also substantially greater than the combined area of the inlet apertures 22 to further increase the velocity of the air passing through the venturi passage 31 to induce a greater flow of air through the apertures 28 and thus to more effectively cool the brake drum.

By forming the wheel cover of two parts joined together as illustrated in Fig. 3 in the drawings, the three layers of metal, 13, 16 and 17, serve to reinforce and strengthen the cover structure and more particularly the attachment member 18, thus causing the spurs 19 to be urged into tighter engagement with a tire rim.

While the invention has been shown in but one form, it is obvious to those skilled in the art that it is not so limited, but is susceptible of various changes and modifications without departing from the spirit and scope of the claimed invention.

We claim:

1. In a wheel structure, a vehicle wheel comprising a tire rim secured to an apertured plate, a brake drum mounted on said plate, a wheel cover comprising an apertured hub portion, an annular axially extending marginal wall joined to the hub portion by a web portion, said wall having circumferentially spaced outlet apertures and vanes adapted to move streams of air inwardly through said apertured hub portion and thence outwardly through said outlet apertures, said vanes projecting inwardly from said wall and extending axially thereof, and means for detachably mounting the cover upon the tire rim, with the periphery of the cover in circular abutting engagement with the rim, said means comprising an annular attachment member having an outwardly projecting annular flange on one end thereof and radially outwardly projecting spurs adjacent the other end thereof, said marginal wall having interconnected annular web and flange portions defining an annular recess to receive the attachment member flange.

2. In a wheel structure, a vehicle wheel comprising a tire rim secured to an apertured plate, a brake drum mounted on said plate, a wheel cover comprising an apertured hub portion, an annular axially extending marginal wall joined to the hub portion by a web portion, said wall having circumferentially spaced outlet apertures and vanes adapted to move streams of air inwardly through said apertured hub portion and thence outwardly through said outlet apertures, said vanes projecting inwardly from said wall and extending axially thereof, and means for detachably mounting the cover upon the tire rim, with the periphery of the cover in circular abutting engagement with the rim, said means comprising an annular attachment member having an outwardly projecting annular flange on one end thereof and radially outwardly projecting spurs adjacent the other end thereof, said marginal wall having interconnected annular web and flange portions defining an annular recess to receive the attachment member flange, each of said spurs being inclined outwardly toward the flanged end of said attachment member and having a pointed outer end to dig into a tire rim.

3. In a wheel structure, a vehicle wheel comprising a tire rim secured to an apertured plate, a brake drum mounted on said plate, a wheel cover comprising an apertured hub portion, an annular axially extending marginal wall joined to the hub portion by a web portion, said wall having circumferentially spaced outlet apertures and vanes adapted to move streams of air inwardly through said apertured hub portion and thence outwardly through said outlet apertures, said vanes projecting inwardly from said wall and extending axially thereof, and means for detachably mounting the cover upon the tire rim, with the periphery of the cover in circular abutting engagement with the rim, said means comprising an annular attachment member having an outwardly projecting annular flange on one end thereof and radially outwardly projecting spurs adjacent the other end thereof, said marginal wall having interconnected annular web and flange portions defining an annular recess to receive the attachment member flange, each of said spurs being inclined outwardly toward the flanged end of said attachment member and having a pointed outer end to dig into a tire rim, said spurs being arranged in sets circumferentially spaced on the attachment member.

References Cited in the file of this patent
UNITED STATES PATENTS

| 1,958,484 | Lyon | May 15, 1934 |
| 2,019,145 | Jeune | Oct. 29, 1935 |
| 2,022,174 | Allee | Nov. 26, 1935 |
| 2,633,944 | Butterfield | Apr. 7, 1953 |
| 2,646,862 | Dodge | July 28, 1953 |
| 2,682,937 | Lyon | July 6, 1954 |
| 2,689,770 | Pipes | Sept. 21, 1954 |
| 2,698,203 | Landell | Dec. 28, 1954 |
| 2,746,805 | Gamundi | May 22, 1956 |

FOREIGN PATENTS

| 431,007 | Italy | Feb. 23, 1948 |